US006242090B1

(12) United States Patent
Green et al.

(10) Patent No.: US 6,242,090 B1
(45) Date of Patent: Jun. 5, 2001

(54) FIBRE REINFORCED RESIN COMPOSITE PRODUCTS

(75) Inventors: George Edward Green, Stapleford; John Cook, Shelford, both of (GB)

(73) Assignee: Hexcel Corporation, Dublin, CA (US)

( * ) Notice: Subject to any disclaimer, the term of this patent is extended or adjusted under 35 U.S.C. 154(b) by 0 days.

(21) Appl. No.: 09/609,959

(22) Filed: Jul. 5, 2000

Related U.S. Application Data

(62) Division of application No. 08/097,140, filed on Jul. 26, 1993, now Pat. No. 6,133,167.

(51) Int. Cl.$^7$ ................................................. B32B 15/04
(52) U.S. Cl. ..................... 428/354; 428/304; 428/301; 428/302; 428/298; 442/65; 442/64; 442/164; 442/168; 442/175; 264/241; 264/257; 264/258; 264/260; 264/297.4; 427/407.1; 427/407.2; 427/407.3; 427/412
(58) Field of Search ..................... 428/354, 298, 428/300, 301, 302; 427/407.1, 407.2, 407.3, 412; 264/241, 257, 258, 260, 297.4; 442/64, 65, 164, 168, 175

(56) References Cited

U.S. PATENT DOCUMENTS

| 3,784,433 | 1/1974 | Garnish et al. . |
| 3,790,432 | 2/1974 | Fletcher et al. . |
| 4,194,618 | 3/1980 | Malloy . |
| 4,302,499 | 11/1981 | Grisch . |
| 4,311,661 | 1/1982 | Palmer . |
| 4,349,401 | 9/1982 | Dahlberg . |
| 4,395,459 | 7/1983 | Herschdorfer et al. ............... 428/391 |
| 4,622,091 | 11/1986 | Letterman ............................. 156/286 |
| 4,900,048 | 2/1990 | Derujinsky . |
| 4,917,742 | 4/1990 | Watanabe . |
| 5,051,144 | 9/1991 | Kistner ................................... 156/85 |
| 5,431,995 | 7/1995 | Narita et al. . |

FOREIGN PATENT DOCUMENTS

| 3536272 | 4/1987 | (DE) . |
| 0 110 332 | 6/1984 | (EP) . |
| 0 158 116 | 10/1985 | (EP) . |
| 0 224 064 | 6/1987 | (EP) . |
| 1227910 | 4/1971 | (GB) . |
| 1248680 | 9/1971 | (GB) . |
| 1298936 | 12/1972 | (GB) . |
| 1299177 | 12/1972 | (GB) . |
| 1314736 | 4/1973 | (GB) . |
| 1324898 | 7/1973 | (GB) . |
| 1327931 | 8/1973 | (GB) . |
| 1426077 | 2/1976 | (GB) . |
| 1542153 | 3/1979 | (GB) . |
| 53-117065 | 10/1978 | (JP) . |
| 53-117066 | 10/1978 | (JP) . |
| 53-55005 | 11/1979 | (JP) . |
| 56-115216 | 9/1981 | (JP) . |
| 57-084849 | 5/1982 | (JP) . |
| WO 92117331 A1 | 10/1992 | (WO) . |

OTHER PUBLICATIONS

B. Thorfinnson and T.F. Biermann, Title: Control and Measurement of Prepreg Impregnation for Elimination of Voids in Composite Parts, Publication: *Looking Ahead for Materials and Processes*, Elsevier Science Publishers B.V., Amsterdam, 1987–Printed in the Netherlands.

B. Thorfinnson and T.F. Biermann, Title: Production of Void Free Composite Parts Without Debulking, 31$^{st}$ International SAMPE Symposium, Apr. 7–10, 1986.

*Primary Examiner*—Merrick Dixon
(74) *Attorney, Agent, or Firm*—W. Mark Bielawski; Luther A. R. Hall

(57) ABSTRACT

A method of producing a curable prepreg which comprises (i) sandwiching a multi-ply fabric layer comprising at least two superposed sheets of woven reinforcing fabric between solid films of a curable resin composition and (ii) heating the resulting sandwich under pressure so that the resin composition impregnates the sheets of woven reinforcing fabric to form a coherent curable structure.

17 Claims, No Drawings

FIBRE REINFORCED RESIN COMPOSITE PRODUCTS

This is a divisional of application Ser. No. 08/097,140, filed on Jul. 26, 1993 U.S. Pat. No. 6,133,167.

This invention relates to fibre reinforced resin composite products and their production.

For many years, fibre reinforced resin products used in the aerospace and allied industries have been produced by curing a sheet, or in the case of laminates two or more superposed sheets, of curable fibre reinforced prepreg, i.e. fibrous reinforcing material impregnated by, and within a matrix of, a solid curable resin composition. The fibrous material in such prepregs has conventionally consisted of a single layer of unidirectional fibres, or a single sheet of a woven or non-woven fabric, the fibres and fabric typically being of carbon, glass, aromatic polyamide and mixtures thereof. Thus, for each layer of fibrous reinforcement desired in the cured composite, it has been necessary to use a separate sheet of prepreg. Since the assembling of multilayer laminates has been carried out manually in the aerospace industry to ensure accuracy, the need to use numerous sheets of prepreg each containing only a single fibrous layer results in such assembling being a costly, labour-intensive process.

It has now been found, in accordance with the present invention, that curable prepregs having desirable properties can be obtained by superposing at least two sheets of woven reinforcing fabric, sandwiching the resulting assembly between solid films of curable resin composition and heating the resulting sandwich under heat and pressure so that the resin composition impregnates the sheets of woven reinforcing fabric. By this method, novel curable prepregs having very good surface tack can be produced. These prepregs can be cured by heating, optionally together with other prepregs or resin films, to give cured composites having low void contents and high strengths. Prepregs of the invention reduce the labour involved in the assembling of multilayer laminates. Since such prepregs can be produced in thicknesses which are twice or more times as great as those of conventional prepregs by one fabric-impregnating operation, the cost of producing prepreg required for a given laminate can also be reduced.

Accordingly, the present invention provides in one aspect a method of producing a curable prepreg which comprises (i) sandwiching a multi-ply fabric layer comprising at least two superposed sheets of woven reinforcing fabric between solid films of a curable resin composition and (ii) heating the resulting sandwich under pressure so that the resin composition impregnates the sheets of woven reinforcing fabric to form a coherent curable structure.

In another aspect, the present invention provides a curable prepreg comprising a multi-ply fabric layer which comprises at least two superposed sheets of woven reinforcing fabric impregnated by, and contained within a matrix of, a solid curable resin composition.

The woven reinforcing fabric may be of a material known for the reinforcement of plastics material, for example of carbon, glass, metal, aromatic polyamide, or mixtures of two or more thereof. Woven fabrics of carbon fibre are preferred. The weight and thickness of the fabric are chosen according to the intended use of the prepreg using criteria well known to those skilled in the production of fibre reinforced resin composites. In a particularly preferred embodiment, the multi-ply fabric comprises two superposed sheets of woven reinforcing fabric.

The multi-ply fabric layer may be formed simply by laying the sheets of woven reinforcing fabric on top of each other. If desired, the superposed sheets of woven fabric may be held together by retaining means which inhibits the movement of the sheets in relation to each other. Such retaining means may be, for example, selectively applied adhesive or, preferably, textile stitching.

The curable resin may be of a kind known for use in the production of cured fibre reinforced resin composites. For example, it may be an epoxide resin, i.e. a substance containing on average more than one 1,2-epoxide group per molecule, a phenol-aldehyde resin (which may be a resole or a novolak), a bismaleimide resin, a cyanato resin or a mixture of two or more thereof. Epoxide resins and phenol-aldehyde resoles are preferred, with epoxide resins being especially preferred.

Suitable epoxide resins include polyglycidyl ethers of polyhydric phenols such as bisphenols, for example bis(4-hydroxyphenyl)methane or 2,2-bis(4-hydroxyphenyl)propane, mononuclear polyhydric phenols, for example resorcinol, or phenol- formaldehyde novolaks; aromatic poly(N-glycidylamines) such as bis[4-(diglycidylamino)phenyl]methane, N,N-diglycidylaniline, and the tetra (N-glycidyl) derivatives of $4,4^1$-diamino-3-ethyldiphenylmethane and bis(4-amino-3-ethylphenyl)methane; and mixed N,O-polyglycidyl compounds such as 4-(diglycidylamino)phenyl glycidyl ether.

Where necessary, the curable resin composition also contains a curing agent for the curable resin. For example, when the curable resin is an epoxide resin, the composition also contains a curing agent for epoxide resins, for example an aromatic polyamine such as bis(4-aminophenyl)methane, $4,4^1$-diamino-3-ethyldiphenylmethane, bis(4-amino-3-ethylphenyl)methane, bis(4-aminophenyl)sulphone or mixtures thereof, dicyandiamide, a complex of boron trifluoride with an amine, preferably a primary amine such as ethylamine, or a boron trichloride/amine complex. Where appropriate, the composition may also contain an accelerator for the epoxide cure, such as an accelerator conventionally used with the chosen curing agent. When the curable resin is a novolak resin, a methylene donor, such as the conventionally used hexamethylenetetramine, is included in the composition as curing agent.

The curable resin composition may also contain a solid thermoplastic polymer, particularly when, as in the case of a phenol-aldehyde resole, the curable resin is liquid. When the curable resin is a resole, the thermoplastic polymer may be a polyvinyl acetal such as polyvinyl formal, polyvinyl acetal or polyvinyl butyral, or a nylon. When the curable resin is a novolak, the thermoplastic polymer may be an elastomeric polymer such as a neoprene rubber or a butadiene-acrylonitrile rubber. When the curable resin is an epoxide resin, the thermoplastic polymer may be a polymer having repeating aromatic ether groups —ArO— and/or repeating aromatic sulphone groups —ArSO$_2$—, where Ar is an arylene group, in the polymer backbone, for example a phenoxy resin, a polyphenylene oxide, an aromatic polyetherimide, an aromatic polyetheretherketone (PEEK) resin or a polyethersulphone. Other thermoplastic polymers which may be included in curable epoxide resin compositions are copolymers of an olefinic hydrocarbon with an ethylenically unsaturated ester, such as a copolymer of ethylene with vinyl acetate or ethyl acrylate.

The curable resin composition may also contain minor amounts of additives such as those conventionally included in resin compositions for the production of fibre reinforced composites, for example fillers such as finely divided silica.

The films of curable resin composition used in the method of the invention may be formed by processing the composition in a conventional manner. The films between which the multi-ply fabric is sandwiched for the production of the prepreg may be the same or different; preferably they are of the same solid curable resin composition. The thickness of the films may be such that the films have weights of, for example, 50 to 1000 g/m$^2$, preferably 100 to 400 g/m$^2$. The films may have strippable backing sheets on the faces opposite to those brought into contact with the woven reinforcing fabric; in this embodiment, the films are conventionally formed on the strippable backing sheet. The strippable backing sheet may be of a kind conventionally used with curable resin films, for example of a polyolefin or a polyester, or of a paper coated with a release material such as a silicone.

The prepreg may be made by a batch process in which the multi-ply fabric is laid on a solid film of curable resin composition, a further such film is laid on top of the multi-ply fabric and the resulting assembly is heated under pressure.

Preferably, the prepreg is made continuously by applying continuous solid films of curable resin composition, which are preferably supported on their reverse sides by belts or strippable backing sheets, simultaneously to each face of the multi-ply fabric layer, and passing the resulting sandwich between heated rollers so that the resin composition impregnates the multi-ply fabric to form a coherent curable structure.

As will be apparent to those skilled in the art of prepreg production, the heating of the sandwich of multi-ply fabric between films of resin composition should be insufficient to cure the resin. Generally, the sandwich is heated at a temperature of 50 to 180° C., preferably 70 to 140° C., for a time sufficient for the resin composition to impregnate the multi-ply fabric. The pressure under which the sandwich is heated may be, for example, from 150 to 1000 kPa, preferably from 200 to 600 kPa.

A prepreg in accordance with the invention may be converted into a cured fibre reinforced composite by heating the prepreg, after removal of any strippable backing sheet, until it is cured. Curing temperatures will vary according to the nature of the resin and, if present, the curing agent and are well known to those skilled in the art. The curing may be carried out in a mould to produce a cured article of a particular shape. A cured laminate may be obtained by heating under pressure an assembly of two or more layers of a prepreg of the invention, or one or more layers of a prepreg of the invention together with one or more layers of another prepreg and/or one or more layers of a curable resin composition.

The invention is illustrated by the following Example.

EXAMPLE

A multi-ply fabric consisting of two superposed sheets of woven carbon fibre fabric, each sheet weighing 370 g/m$^2$, is laid on top of a solid film of a curable epoxide resin composition containing dicyandiamide as curing agent, the film weighing 200 g/m$^2$, supported on a silicone-coated release paper. A second such film is laid on top of the fabric. The resulting assembly is heated in a press at 80° C. under a pressure of 300 kPa for 1 minute so that the resin composition impregnates the fabric to form a coherent curable prepreg having a thickness of 0.9 mm and good surface tack.

3 pieces of this prepreg, each measuring 10 cm×13 cm, are superposed and heated at 125° C. for 60 minutes under a pressure of 700 kPa to form a cured laminate. The resulting laminate has an interlaminar shear strength of 70.4 MPa at 22° C.

What is claimed is:

1. A method of producing a curable prepreg which comprises (i) sandwiching a multi-ply fabric layer comprising at least two superposed sheets of woven reinforcing fabric between solid films of a curable resin composition and (ii) heating the resulting sandwich under pressure so that the resin composition impregnates the sheets of woven reinforcing fabric to form a coherent curable structure.

2. A method according to claim 1, in which the multi-ply fabric layer comprises two superposed sheets of woven reinforcing fabric.

3. A method according to claim 1, in which the woven reinforcing fabric is of carbon fiber.

4. A method according to claim 1, in which the superposed sheets of woven fabric are held together by retaining means which inhibits movement of the sheets in relation to each other.

5. A method according to claim 4, in which the retaining means is textile stitching.

6. A method according to claim 1, in which the multi-ply fabric is sandwiched between films of the same curable resin composition.

7. A method according to claim 1, in which the multi-ply fabric is laid on a solid film of curable resin composition, a further film of curable resin composition is laid on top of the multi-ply fabric and the resulting assembly is heated under pressure.

8. A method according to claim 1, in which the prepreg is made continuously by applying continuous solid films of curable resin composition simultaneously to each face of the multi-ply fabric and passing the resulting sandwich between heated rollers so that the resin composition impregnates the multi-ply fabric to form a coherent curable structure.

9. A method according to claim 1, in which the sandwich is heated at a temperature of 50 to 180° C. so that the resin composition impregnates the fabric.

10. A method according to claim 9, in which the temperature is 70 to 140° C.

11. A method according to claim 1, in which the pressure under which the sandwich is heated is from 150 to 1000 kPa.

12. A method according to claim 11, in which the pressure is from 200 to 600 kPa.

13. A curable prepreg consisting essentially of a multi-ply fabric layer, which comprises at least two superposed sheets of woven reinforcing fabric, impregnated by, and contained within a sheet matrix of, a solid curable resin composition in which the superposed sheets of woven fabric are held together by a retaining means which inhibits movement of the sheets in relation to each other.

14. A prepreg according to claim 13, in which the multi-ply fabric layer comprises two superposed sheets of woven reinforcing fabric.

15. A prepreg according to claim 13, in which the woven reinforcing fabric is of carbon fiber.

16. A prepreg according to claim 13, in which the retaining means is textile stitching.

17. A prepreg according to claim 13, in which the curable resin is an epoxide resin or a phenol-aldehyde resol.

* * * * *